United States Patent

[11] 3,560,797

| [72] | Inventors | Jean Pineau<br>Suresnes;<br>Francois Peroy, Bourg-La-Reine, France |
|---|---|---|
| [21] | Appl. No. | 759,392 |
| [22] | Filed | Sept. 12, 1968 |
| [45] | Patented | Feb. 2, 1971 |
| [73] | Assignee | Regie Nationale Des Usines Renault<br>Billancourt (Hauts de Seine), France |
| [32] | Priority | Sept. 15, 1967 |
| [33] | | France |
| [31] | | 121,165 |

[54] ELECTRIC MOTOR PROTECTION DEVICES
4 Claims, 3 Drawing Figs.

[52] U.S. Cl. .................................................. 317/13,
317/16, 317/40, 317/41, 317/152
[51] Int. Cl. .................................................. H02h 7/085,
H02h 5/04
[50] Field of Search .......................................... 317/13, 16,
40, 41, 152

[56] References Cited
UNITED STATES PATENTS

| 894,705 | 7/1908 | Schattner | 317/16 |
| 2,572,637 | 10/1951 | Lincks | 317/16X |
| 3,359,434 | 12/1967 | Galluzzi | 317/16X |
| 3,368,110 | 2/1968 | Taylor | 317/16 |
| 3,382,409 | 5/1968 | Assow et al. | 317/16 |
| 3,452,252 | 6/1969 | Mapham | 317/16 |

*Primary Examiner*—James D. Trammell
*Attorney*—Stevens, Davis, Miller & Mosher

ABSTRACT: An auxiliary overload breaker circuit parallel to the motor circuit comprises a member enabling said circuit to receive a considerable current in relation to the maximum current flowing through the motor and to which it is added when flowing through the breaker, thus reducing to a substantial proportion the opening time of the breaker.

PATENTED FEB 2 1971    3,560,797

ELECTRIC MOTOR PROTECTION DEVICES

This invention relates to a device for protecting electric motors, notably those of the type used in automobile construction for operating window regulators, sliding roof panels, folding hoods, seats, etc.

For obvious reasons, notably for the sake of wiring simplification and economy, hitherto known motor driven systems designed for these purposes do not include any limit switches. As a result, if tee member controlling the energization of the corresponding motor is kept in its motor energizing position after the necessary stroke has been completed, the motor armature is "locked" and the current flowing through its winding reaches considerable values. As a rule, a thermal breaker is provided in series in the circuit to protect the motor against these overcurrent conditions. However, in order to achieve an efficient protection manufactures have sometimes been led to incorporate breakers preset to open the energizing circuit very rapidly when the armature winding is short circuited. This arrangement however is objectionable in that it may involve an untimely circuit-breaking in case of considerable increment in the reaction torque during the motor operation, for example when starting or clearing a lock member or the like. This condition also led manufacturers manufacturers to take a middle course by so adjusting the breaker as to cause the circuit to open after a longer time period, this obviously implying the risk of seriously damaging the motor is for example, as a consequence of overheating, the blocked-torque current decreases slightly.

It is the object of tee present invention to provide an improvement in devices for protecting electric motors whereby the inconveniences set forth hereinabove can be avoided and momentary current peaks corresponding to various "hard points" can safely be cleared without breaking the motor energizing circuit.

The inventive device for protecting an electric motor energized by an appropriate circuit comprises a breaker in series with the motor and preset to open only after a relatively long time period. This opening time is substantially reduced when the current in the breaker increases above a predetermined limit. The device has, in an auxiliary overload circuit connected in parallel to the motor, an electrically actuated overloading means which, after a predetermined time, conducts an overload current of a value which is quite considerable on comparison with the value of the maximum allowed current in the motor. The auxiliary circuit current is added to the motor current to flow through the breaker.

Two typical forms of embodiment of this improvement will now be described by way of example with reference to the attached drawing, in which.

Figure 1:
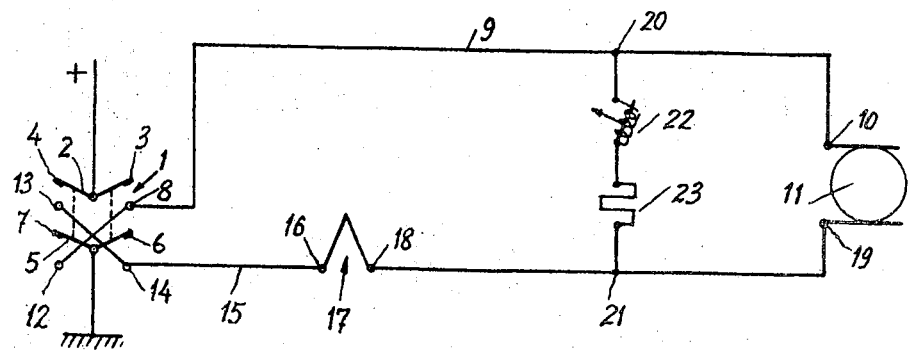
FIG. 1 illustrates the wiring diagram of a device comprising an auxiliary circuit incorporating in turn a timelag contact.

Referring first to FIG. 1, a bipolar reversing switch 1 having two front positions and one back position comprises a first movable contact arm 2 carrying two contacts 3 and 4 which is connected to the positive terminal + of the source of current, and another movable contact arm 5 mechanically coupled to said first arm 2 and carrying two contacts 6 and 7, this other arm 5 being connected to the negative terminal − of the current source. The first fixed contact 8 of the first switch terminal is connected via a wire 9 to a terminal 10 of motor 11 and through a shunt wire to the second fixed contact 12 of the other switch terminal; the second fixed contact 13 of the first terminal is connected to the first fixed contact 14 of the other terminal. Contact 14 is connected via a wire 15 to one terminal 16 of a breaker 17 having its other terminal 18 connected to the second terminal 19 of motor 11, as shown.

An auxiliary overload circuit connected at 20 and 21 in parallel to the motor 11 comprises, in series therewith, a timelag contact 22 of the thermal, mechanical, electromechanical, electronic or other type, and a resistor 23 calculated as a function of the desired cutout speed of breaker 17 and adapted to adjust the closing time of timelag contact 22.

When the movable contacts 3 and 6 of reversing switch 1 engage the corresponding fixed contacts 8 and 14 respectively, the motor 11 is energized and rotates in one direction; when the switch position is reversed in the movable contacts 4 and 7 engage the registering fixed contacts 13 and 12 respectively the direction of rotation of motor 11 is reversed. In either case the current flowing through the breaker 17 is the sum of the currents flowing through both the motor 11 and the auxiliary overload circuit 20, 21. In case of temporary overload applied to the shaft of motor 11, the will open the energizing circuit only after the transfer time of the timelag contact 22, when the latter, by closing, increases the current flowing through resistor 23. This transfer time is selected to be short enough to prevent any damaging of the motor by abnormal overheating.

Figure 2:
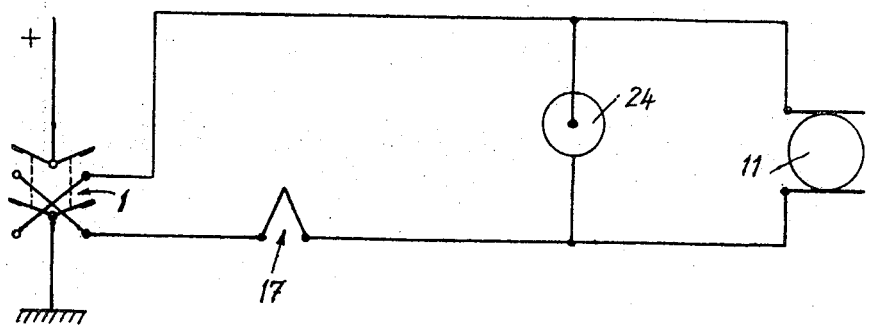
FIG. 2 shows a similar circuit but wherein the auxiliary circuit incorporates a nonlinear resistor.

As a modification of the above-described arrangement the circuit shown in FIG. 2 comprises an auxiliary overload circuit comprising a nonlinear resistor 24 consisting for example of a silicon carbide agglomerate and calculated to cause the breaker 17 to open the circuit after a predetermined time period. This element may be used either singly or in series with a conventional resistor acting as a bumper resistor.

Figure 3:
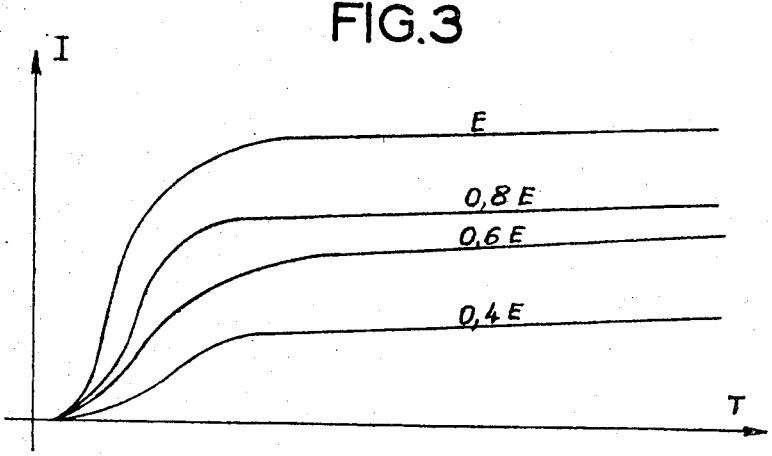
FIG. 3 illustrates the current time characteristics curve obtaining with the nonlinear resistor of the auxiliary circuit of FIG. 2.

FIG. 3 illustrates the characteristics current curves obtaining in a nonlinear resistor as a function of time according to the voltage E and of the conventional series-connected resistor reducing proportionally the voltage applied to the first resistor.

We claim:

1. A device for protecting an electric motor energized by a circuit comprising a motor, a breaker in series with the motor and preset to open only after a relatively long time periods which is substantially reduced when the current in the breaker increases above a predetermined limit, an auxiliary overload circuit connected in parallel to said motor, an electrically acting overloading means in and enabling said auxiliary overload circuit, after a predetermined time, to conduct overload current of a considerable value in comparison with the value of the maximum allowed current in said motor, said auxiliary circuit current being added to said motor current to flow through said breaker.

2. A device according to claim 1, wherein said overloading means comprises a timelag switch in series with a resistor, the resistance of which is a function of the cutout speed of said breaker and is adjusted for the closing time of said timelag switch.

3. A device according to claim 1, wherein said overloading means comprises a nonlinear resistor of a silicon carbide agglomerate type.

4. A device according to claim 2, further comprising an ohmic resistor in series with said nonlinear resistor in said auxiliary circuit.